United States Patent [19]
Fujihara et al.

[11] Patent Number: 5,771,083
[45] Date of Patent: Jun. 23, 1998

[54] ACTIVE MATRIX SUBSTRATE AND LIQUID CRYSTAL DISPLAY DEVICE

[75] Inventors: Masaki Fujihara, Tenri; Yuzuru Kanemori, Nara; Masaya Okamoto, Soraku-gun, all of Japan

[73] Assignee: Sharp Kabushiki Kaisha, Osaka, Japan

[21] Appl. No.: 725,663

[22] Filed: Oct. 1, 1996

[30] Foreign Application Priority Data

Oct. 16, 1995 [JP] Japan .................................... 7-267307

[51] Int. Cl.$^6$ ................................................ G02F 1/1343
[52] U.S. Cl. ............................ 349/147; 349/148; 349/39
[58] Field of Search ................................... 349/148, 147, 349/39, 143

[56] References Cited

U.S. PATENT DOCUMENTS

| | | | |
|---|---|---|---|
| 4,689,116 | 8/1987 | Coissard et al. | 349/140 |
| 4,816,885 | 3/1989 | Yoshida et al. | 349/147 |
| 5,032,883 | 7/1991 | Wakai et al. | 349/147 |
| 5,166,085 | 11/1992 | Wakai et al. | 257/59 |
| 5,212,574 | 5/1993 | Katayama et al. | 349/148 |
| 5,585,951 | 12/1996 | Noda et al. | 349/122 |
| 5,641,974 | 6/1997 | den Boer et al. | 257/59 |
| 5,650,834 | 7/1997 | Nakagawa et al. | 349/139 |

FOREIGN PATENT DOCUMENTS

| | | |
|---|---|---|
| 61-156025 | 7/1986 | Japan . |
| 135351 | 7/1989 | Japan . |
| 4307521 | 10/1992 | Japan . |
| 474714 | 11/1992 | Japan . |
| 6230422 | 8/1994 | Japan . |
| 2244860 | 12/1991 | United Kingdom .................. 349/147 |

OTHER PUBLICATIONS

Fujita et al: "Colorless Polyimide," vol. 29, No. 1 (Jun. 1991), pp. 20–28.

Sakamoto et al: "27.3: A High–Aperture–Ratio 3–in.–Diagonal VGA a–Si Light Valve with Pixel/Data and Pixel/Gate Lins Overlapping," *SID 96 Digest*, pp. 681–684, 1996.

Kim et al: "4:3: High–Aperture and Failt–Tolerant Pixel Structure for TFT–LCDs," *SID 95 Digest*, pp. 15–18, 1995.

Society for Information Display International Symposium Digest of Technical Papers, vol. XXVI, Walt Disney World Dolphin Hotel, Orlando, Florida May 23–25, 1995, S.S. Kim et al, 4:3: High–Apertue and Fault–Tolerant Pixel Structure for TFT–LCDs, pp. 15–18.

*Primary Examiner*—William L. Sikes
*Assistant Examiner*—Tiep H. Nguyen
*Attorney, Agent, or Firm*—Nixon & Vanderhye P.C.

[57] ABSTRACT

A liquid crystal display device incorporating an active matrix substrate having an inter-layer insulating film between a pixel electrode and gate and source signal lines. In this liquid crystal display device, the source signal line has a double-layer structure of an upper-layer line and a lower-layer line, but the upper-layer line is eliminated at the intersection of the gate signal line and the source signal line. This structure prevents a decrease in the thickness of the inter-layer insulating layer on the intersection of the gate signal line and the source signal line.

20 Claims, 8 Drawing Sheets

ACTIVE MATRIX SUBSTRATE AND LIQUID CRYSTAL DISPLAY DEVICE

RELATED APPLICATIONS

This application is related to the following commonly assigned co-pending applications: Ser. No. 08/695,632, filed Aug. 12, 1996; Ser. No. 08/712,978, filed Sep. 12, 1996; Ser. No. 08/700,172, filed Aug. 20, 1996; Ser. No. 08/697,277, filed Aug. 27, 1996; and Ser. No. 08/705,759, filed Aug. 30, 1996; and Ser. No. 08/720,152 filed Sep. 25, 1996.

FIELD OF THE INVENTION

The present invention relates to an active matrix substrate having thereon switching elements such as thin film transistors (hereinafter referred to as "TFT"), and also relates to a liquid crystal display device incorporating the active matrix substrate.

BACKGROUND OF THE INVENTION

Liquid crystal display devices are now practically used as terminal-oriented display devices, for example liquid crystal televisions, word processors, and personal computers. A known conventional liquid crystal display device is an active matrix type liquid crystal display device. The active matrix type liquid crystal display device is produced by fabricating pixel electrodes in a matrix form and connecting a switching element to each of the pixel electrodes so that the light transmittance of each pixel is independently controlled. A characteristic of the active matrix type liquid crystal display device is its high-contrast, high-quality display.

One type of a liquid crystal display device is constructed by arranging an inter-layer insulating film between the pixel electrode and signal wiring including a scanning line (hereinafter referred to as "the gate signal line") and a signal line (hereinafter referred to as "the source signal line") in the direction of thickness. This arrangement can overlap the signal wiring and the pixel electrode, thereby achieving a high aperture ratio.

The active matrix type liquid crystal display device is fabricated by placing a liquid crystal between two light transmitting substrates. Formed on one of the substrates are signal wiring, a switching element, a pixel electrode, and so on. This substrate will be referred to as "the active matrix substrate" in the following explanation. Meanwhile, a common electrode, a light blocking film, etc. are formed on the other substrate. This substrate will be referred to as "the counter substrate" below.

Referring now to FIGS. 7 and 8, the following description will discuss the structure disclosed in U.S. Pat. No. 5,032,883 as an example of a conventional active matrix type liquid crystal display device. As illustrated in FIG. 7, on an active matrix substrate of this active matrix type liquid crystal display device, a gate signal line 113 and a drain signal line 114 are formed to cross each other at a right angle, and a TFT 111 as a switching element is formed in the vicinity of the intersection of the gate signal line 113 and the drain signal line 114. In the structure of a counter substrate facing the active matrix substrate, a transparent electrode 115 is formed on a surface of an insulation substrate 116. The active matrix substrate and the counter substrate are fastened to face each other, and a liquid crystal 117 is sandwiched therebetween.

FIG. 8 is a cross section showing the structure of the conventional active matrix substrate. As illustrated in FIG. 8, in the conventional active matrix substrate, a gate electrode 102, a gate insulating film 103, and a semiconducting film 104 are formed in this order on a surface of an insulation substrate 101. Formed on a surface of the semiconducting film 104 are a drain electrode 106 having a two-layer structure composed of a contact film 106a and a metal film 106b, and a source electrode 107 having a two-layer structure composed of a contact film 107a and a metal film 107b. A transparent insulating film 108 is formed by $SiO_2$, polyimide, or acrylic resin to cover the drain electrode 106 and the source electrode 107. A pixel electrode 110 is formed on the transparent insulating film 108. The pixel electrode 110 and the source electrode 107 are connected through a contact hole 109.

Like the conventional active matrix substrate mentioned above, in the structure where an inter-layer insulating film (the transparent insulating film 108) is formed between the signal wiring (the gate signal line 113 and the drain signal line 114) and the pixel electrode (the pixel electrode 110), it is possible to overlap the pixel electrode and the signal wiring. Namely, with the use of such an active matrix substrate, the aperture ratio of a liquid crystal display device can be improved. However, when the signal wiring and the pixel electrode overlap, the capacitance between the signal wiring and the pixel electrode increases, and the following new three problems arise. (1) Flicker appears on the display. (2) The field through of a write voltage to a pixel becomes larger due to a gate signal which drives the TFT in a controlled manner, and the waveform of the gate signal becomes less sharper, resulting in a lowering of the display quality. (3) Since the data signal retained in the pixel electrode during a data retaining period oscillates due to an electric potential of a data signal from the source signal line, an effective voltage to be applied to the pixel electrode varies and cross-talk occurs between adjacent pixels in a vertical direction on the display, resulting in a lowering of the display quality.

In order to solve the above problems, it is necessary to minimize the capacitive component produced between the pixel electrode and the signal wiring. In order to achieve this object, it is necessary to decrease the relative permittivity of the inter-layer insulating film formed between the pixel electrode and the gate signal line and source signal line, and to increase the film thickness of the inter-layer insulating layer.

However, an inorganic film such as silicon nitride which is used as the inter-layer insulating film in a prior art has a very high relative permittivity of around 7. It is therefore necessary to make the film extremely thick to reduce the capacitance. Such an increase in the film thickness causes film separation and requires a great time for the film formation process, and is thus not suitable for practical use.

On the other hand, an organic film with insulating properties usually has a comparatively low relative permittivity of not higher than 4, and is capable of reducing the capacitance. Moreover, the film thickness of the inter-layer insulating film can be increased to around 3 $\mu$m quite easily by spincoating. However, if the film thickness of the inter-layer insulating film is increased, an increasing number of problems are to be solved technically. The problems include: difficulty in making the film thickness uniform, difficulty in adjusting the viscosity of materials, difficulty in forming the contact hole, and a lowering of light transmittance. Considering these factors, a technically available film thickness is decided. In this case, however, at the intersection of the signal lines (for example, the gate and source signal lines), the film thickness of the inter-layer insulating film is reduced by an amount corresponding to the overlapped section of the signal wiring.

SUMMARY OF THE INVENTION

The first object of the present invention is to reduce the rise at the intersection of lines on an active matrixsubstrate having more than one kind of lines arranged to cross each other at right angles.

The second object of the present invention is to provide a liquid crystal display device having improved display quality by reducing a capacitive component produced between a pixel electrode and gate and source signal lines.

In order to achieve the first object, an active matrix substrate of the present invention includes a substrate, and more than one kind of lines made of an electrically conductive film, arranged to cross each other on the substrate, wherein a film thickness of one of the lines at the intersection of the lines is thinner than a film thickness thereof at portions other than the intersection. This structure prevents the active matrix substrate from becoming thicker at the intersection of the lines cross, thereby achieving a flatter active matrix substrate.

In order to achieve the second object, another active matrix substrate of the present invention includes:

a) a scanning line and a signal line arranged to cross each other;

b) a switching element to which a scanning signal and a data signal are supplied by the scanning line and said signal line, respectively;

c) a pixel electrode driven by the switching element; and d) an inter-layer insulating film which is formed between the pixel electrode and the scanning and signal lines, and has a contact hole through which the switching element is electrically connected to the pixel electrode, wherein a film thickness of at least one of the scanning line and the signal line at the intersection of the scanning line and the signal line is thinner than a film thickness thereof at portions other than the intersection.

This structure can reduce the rise at the intersection of the scanning line and the gate signal line. It is therefore possible to increase the film thickness of the inter-layer insulating film on the intersection. Namely, it is possible to minimize the capacitive component formed between the intersection and the pixel electrode. Thus, the use of the active matrix substrate can reduce the effect of the capacitive component on the display, and achieve a liquid crystal display device with improved display quality.

In addition, it is preferred to form at least one of the scanning line and the signal line by an electrically conductive multi-layer film, and eliminate at least one of layers forming the multi-layer film at the intersection. Such a structure can be easily achieved using thin-film techniques.

It is also preferred to form the electrically conductive multi-layer film by a first layer made of ITO and a second layer made of a metal having a lower electrical resistance than ITO, and to eliminate the second layer at the intersection. In this structure, since ITO has the property of forming a relatively thin film, it is possible to further reduce the rise at the intersection. Moreover, since the second layer is made of a metal having a small electrical resistance, it is possible to achieve an active matrix substrate having a small wiring resistance. Hence, if this active matrix substrate is used, a liquid crystal display device with further improved display quality can be achieved.

On the other hand, in a structure in which the inter-layer insulating film is made of an acrylic resin, since the relative permittivity of the acrylic resin is as small as 4 or less, it is possible to further reduce the capacitive component produced between the pixel electrode and the scanning and signal lines. By reducing the capacitive component formed between the pixel electrode and the scanning and signal lines, it is possible to minimize vicious effects on the display even when these lines and the pixel electrode are constructed to overlap each other.

In order to achieve the second object, a method for fabricating an active matrix substrate of the present invention includes the steps of:

a) forming a gate electrode, the gate signal line, and a storage capacitor line on a substrate;

b) forming a TFT;

c) forming a source electrode of the TFT, a lower-layer line of the source signal line connected to the source electrode, and an extended section which is extended from a drain electrode of the TFT to a position where the extended section overlaps the storage capacitor line, by forming a pattern with an ITO film; and d) forming an upper-layer line of the source signal line over the lower-layer line of the source signal line except at least the intersection of the source signal line and the gate signal line and forming an upper-layer line of the drain electrode on the extended section by forming a pattern with a metal film having a lower electrical resistance than ITO.

In this structure, the source signal line has a double-layer structure formed by a lower-layer line made of ITO and an upper-layer line made of a metal except at the intersection of the source signal line and the gate signal line, but the source signal line is formed only by the lower-layer line made of ITO at the intersection. This structure can reduce the rise at the intersection of the source signal line and the gate signal line. Additionally, the fabrication process is simplified by forming the source electrode, the lower-layer line of the source signal line, and the extended section simultaneously by the formation of a pattern with ITO, and by forming the upper-layer line of the source signal line and the upper-layer line of the drain electrode simultaneously by the formation of a pattern with the metal film.

In order to achieve the second object, another method for fabricating an active matrix substrate of the present invention includes the steps of:

a) forming a gate electrode, a lower-layer line of the gate signal line, and a lower-layer line of a storage capacitor line by forming a pattern with an ITO film on a substrate; and b) forming an upper-layer line of the gate signal line over the lower-layer line of the gate signal line except at least the intersection of the source signal line and the gate signal line and for forming an upper-layer line of the storage capacitor line over the lower-layer line of the storage capacitor line except at the intersection of the source signal line and the storage capacitor line by forming a pattern with a metal film having a lower electrical resistance than ITO.

In this structure, the gate signal line has a double-layer structure formed by ITO and a metal except at the intersection of the source signal line and the gate signal line, but the gate signal line is formed only by the lower-layer line made of ITO at the intersection. Similarly, the storage capacitor line has a double-layer structure formed by ITO and a metal except at the intersection of the source signal line and the storage capacitor line, but the storage capacitor line is formed only by the lower-layer line made of ITO at the intersection. This structure can reduce the rise at the intersection of the source signal line and the gate signal line and at the intersection of the source signal line and the storage capacitor line. Additionally, since the lower-layer line of the gate signal line and the lower-layer line of the storage capacitor line are simultaneously formed and the upper-layer line of the gate signal line and the upper-layer line of the storage capacitor line are simultaneously formed, the fabrication process is simplified.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

Figure 1:
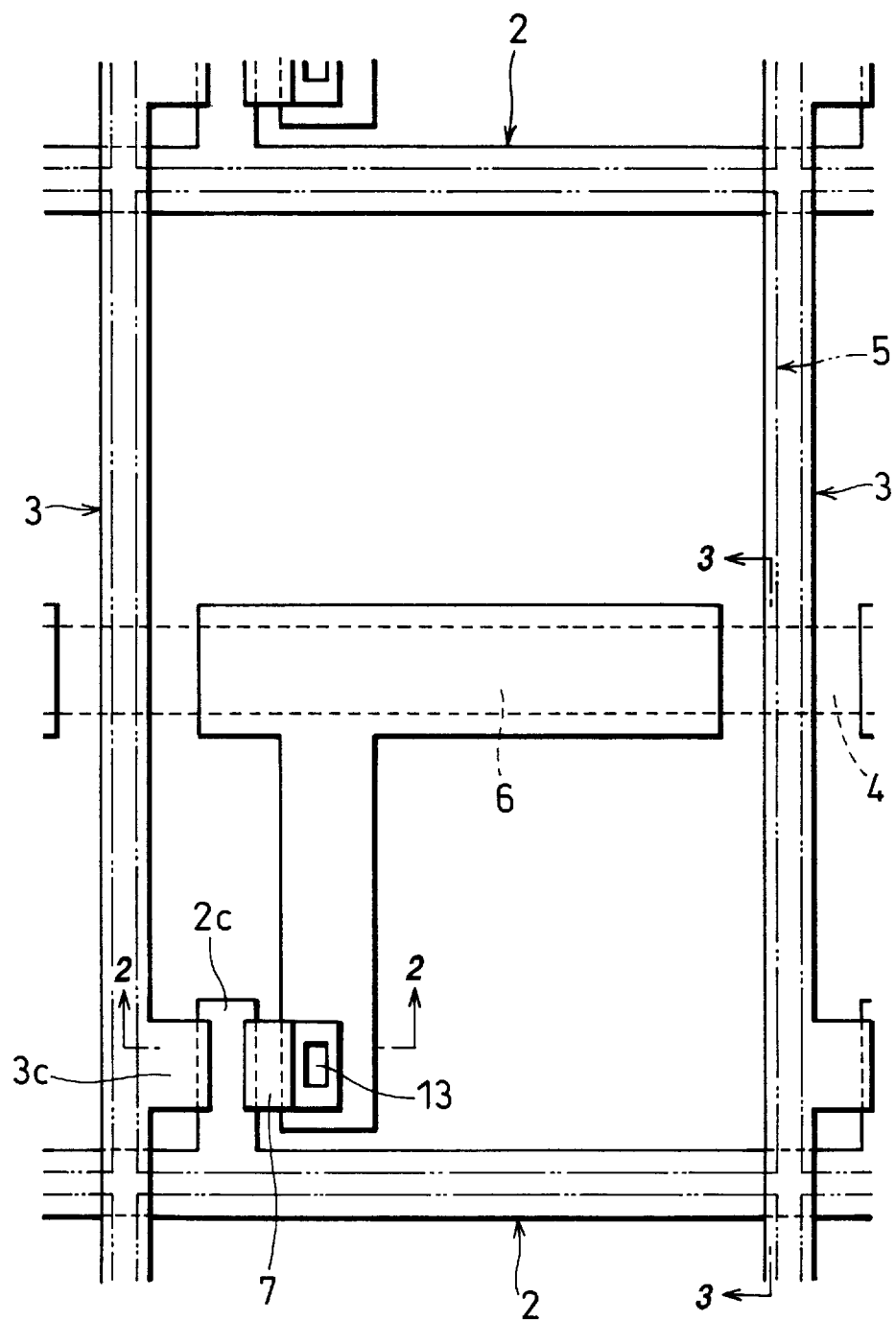
FIG. 1 is a plan view showing the structure of an active matrix substrate used in a liquid crystal display device according to one embodiment of the present invention.
Figure 2:
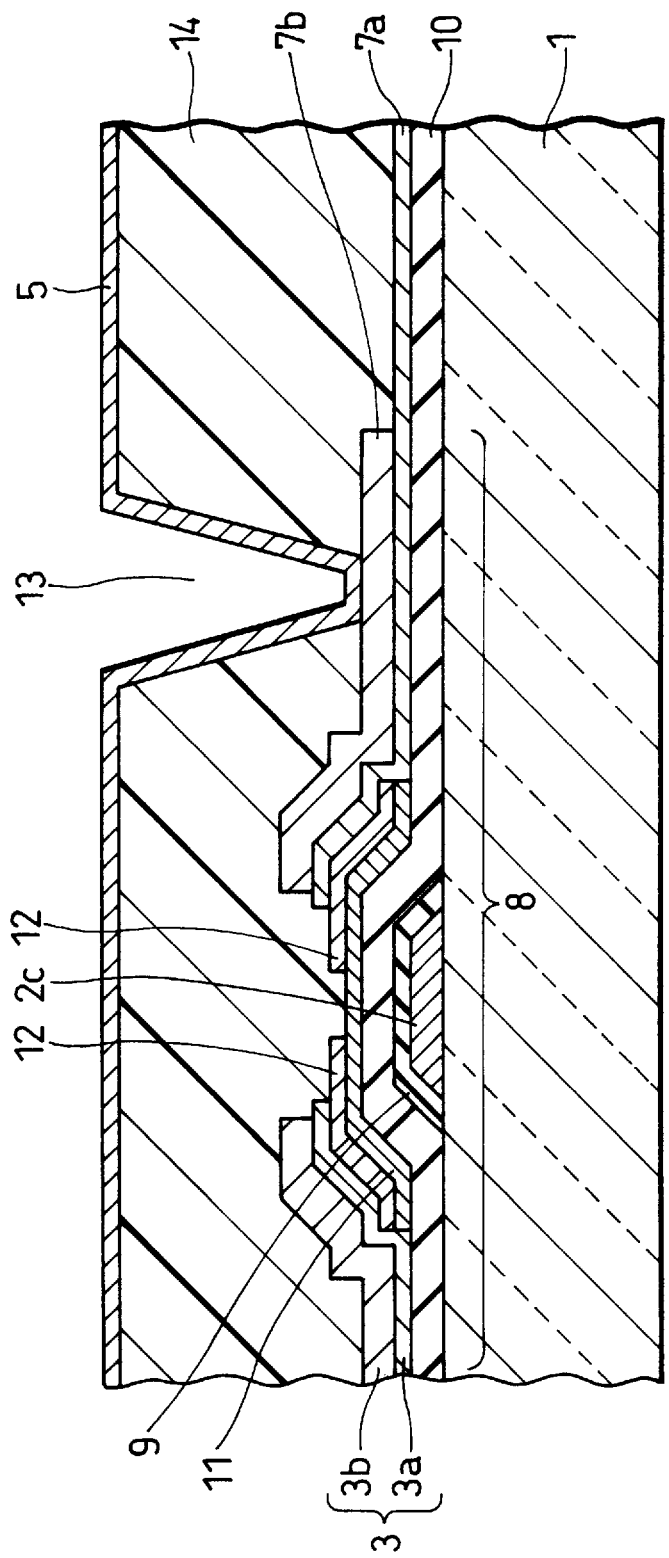
FIG. 2 is a sectional view showing a cross section cut along the A—A plane in FIG. 1.
Figure 3:
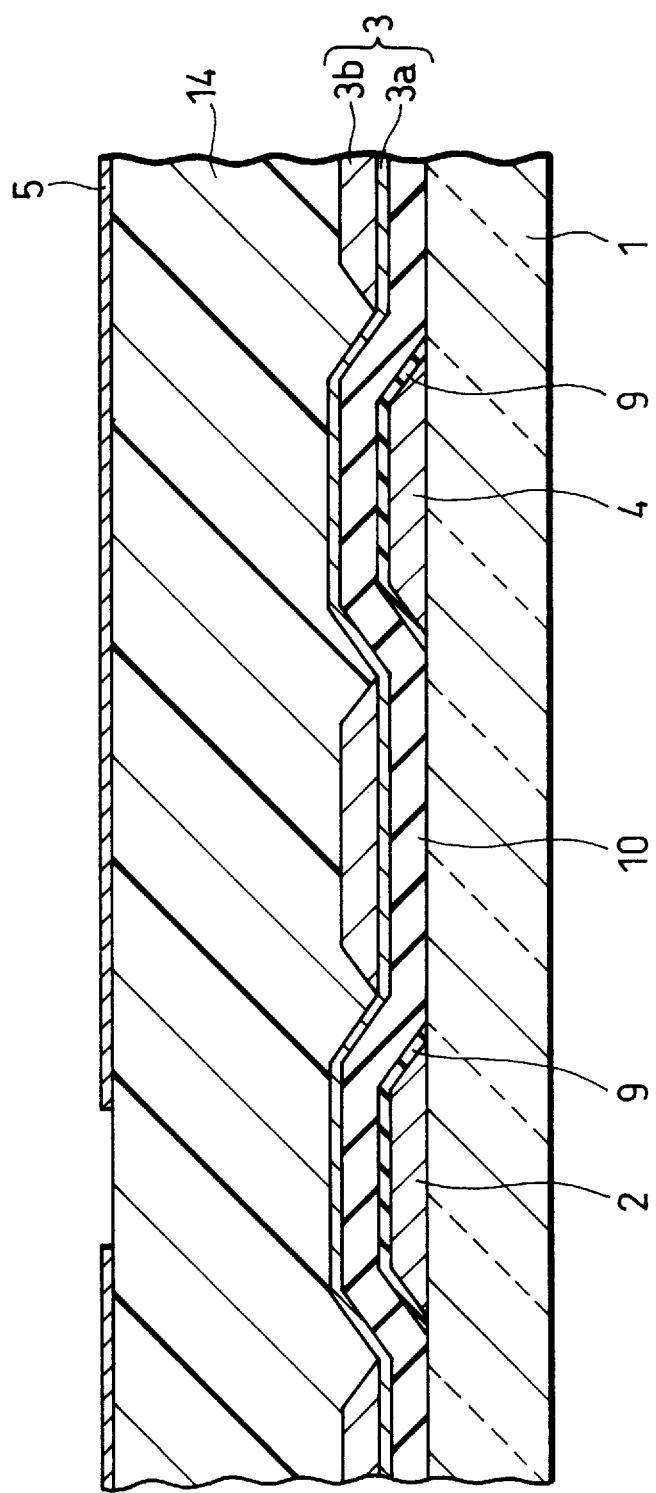
FIG. 3 is a sectional view showing a cross section cut along the B—B plane in FIG. 1.

The following description will discuss one embodiment of the present invention with reference to FIGS. 1 to 3.

FIG. 1 is a plan view showing the structure of an active matrix substrate in a liquid crystal display device according to this embodiment. As illustrated in FIG. 1, a gate signal line 2 (scanning line) and a source signal line 3 (signal line) cross at a right angle on the active matrix substrate. A TFT 8 as a switching element is formed in the vicinity of the intersection of the gate signal line 2 and the source signal line 3. In addition, an inter-layer insulating film (not shown) is provided to cover the above-mentioned members. A pixel electrode 5 is arranged on the inter-layer insulating film.

A gate electrode 2c of the TFT 8 is arranged to protrude from the gate signal line 2. The TFT 8 is driven in a controlled manner by a gate signal input to the gate electrode 2c.

A source electrode 3c of the TFT 8 is arranged to protrude from the source signal line 3. When the TFT 8 is driven, a data signal is input to the pixel electrode 5 through the TFT 8.

In order to improve the display contrast, a storage capacitor section 6 is superimposed on the pixel electrode 5. The storage capacitor section 6 is formed by a storage capacitor line 4 which is arranged parallel to the gate signal line 2, and a drain electrode 7 which is extended from the TFT 8 through a gate insulating film (not shown).

Referring now to FIG. 2, the following description will discuss the structure of the intersection of the TFT 8 and the signal wiring in detail.

FIG. 2 is a sectional view showing a cross section cut along the A—A plane in FIG. 1. As shown in FIG. 2, the TFT 8 as a switching element is mounted on a light transmitting substrate 1. The TFT 8 is formed by the gate electrode 2c, an oxide insulating film 9 of the gate electrode 2c, a gate insulating film 10, a channel layer 11, and contact layers 12. The source signal line 3 of a double-layer structure is connected to one of the contact layers 12 of the TFT 8, while the drain electrode 7 of a double-layer structure is connected to the other contact layer 12. By arranging the drain electrode 7 to have the double-layer structure, the resistance at the junction of the pixel electrode 5 and the drain electrode 7 in a contact hole 13 can be decreased.

Additionally, an inter-layer insulating film 14 is formed to cover all of the above-mentioned members. The pixel electrode 5 is produced on the inter-layer insulating film 14. The contact hole 13 is formed in the inter-layer insulating film 14 by post-treatment. The pixel electrode 5 is connected to the drain electrode 7 through the contact hole 13.

Next, referring to FIG. 3, the structure of the intersections of the gate signal line 2 and the source signal line 3, and of the storage capacitor line 4 and the source signal line 3 will be explained in detail below.

FIG. 3 is a sectional view showing a cross section cut along the B—B plane in FIG. 1. As shown in FIG. 3, the above-mentioned gate signal line 2, the storage capacitor line 4, and their oxide insulating films 9 are formed on the light transmitting substrate 1. In addition, the gate insulating film 10 is formed to cover all of these members. The source signal line 3 is arranged on the gate insulating film 10. The inter-layer insulating film 14 is formed on the source signal line 3. Furthermore, the pixel electrode 5 is produced on the inter-layer insulating film 14.

As is clear from FIG. 3, in the liquid crystal display device of this embodiment, the source signal line 3 is composed of a lower-layer line 3a and an upper-layer line 3b. However, at the intersections of the source signal line 3 and the gate signal line 2 and of the source signal line 3 and the storage capacitor line 4, the upper-layer line 3b is eliminated and only the lower-layer line 3a forms the source signal line 3. In this embodiment, the lower-layer line 3a is made of ITO, and the upper-layer line 3b is made of Ta.

Next, the following description will explain a method for fabricating the active matrix substrate in the liquid crystal display device of this embodiment having the above-mentioned structure.

First, Ta is deposited to form a film having a thickness of 300 nm on the light transmitting substrate 1, for example, a glass substrate, by sputtering. Subsequently, photolithography is used to produce a desired pattern by the Ta film so that the gate signal line 2 having the gate electrode 2c of the TFT 8 and the storage capacitor line 4 are simultaneously formed. Next, the oxide insulating film 9 with a thickness of 300 nm is formed on the surfaces of the gate signal line 2 and the storage capacitor line 4 by anodic oxidation. It is possible to use thermal oxidation instead of anodic oxidation to produce the oxide insulating film 9. Moreover, the gate insulating film 10 with a thickness of 300 nm is formed by silicon nitride over the entire surface of the light transmitting substrate 1 by plasma chemical vapor deposition so as to cover the oxide insulating film 9.

Thereafter, the channel layer 11 made of an amorphous silicon semiconductor in each TFT 8 is formed by plasma CVD. In addition, the contact layer 12 with a thickness of 50 nm is formed by $n^+$ amorphous silicon or $n^+$ microcrystal silicon to which phosphorus is added by plasma CVD. Then, photolithography is used to simultaneously produce a predetermined pattern by the contact layer 12 and the channel layer 11 in regions where the TFTs 8 are formed.

Next, ITO is deposited to form a film with a thickness of 100 nm by sputtering. Subsequently, by producing a predetermined pattern with the ITO film using photolithography, the lower-layer line 3a of the source signal line 3 having the source electrode 3c of the TFT 8, and a lower-layer line 7a of the drain electrode 7, which is extended to the storage capacitor line 4 to achieve a storage capacity, are simultaneously formed. As a result, the gate insulating layer 10 is sandwiched between the storage capacitor line 4 and the lower-layer line 7a of the drain electrode 7, thereby producing the storage capacitor section 6.

Next, Ta is deposited to form a film with a thickness of 300 nm by sputtering. Thereafter, by producing a predetermined pattern with the Ta film using photolithography, the upper-layer line 3b of the source signal line 3 having the source electrode 3c of the TFT 8, and an upper-layer line 7b of the drain electrode 7 are simultaneously formed. At this time, a care must be taken so that the upper-layer line 3b is not formed at the intersection of the source signal line 3 and the gate signal line 2 and at the intersection of the source signal line 3 and the storage capacitor line 4. Moreover, the upper-layer line 7b of the drain electrode 7 is arranged to extend at least to the position of the contact hole 13 in the inter-layer insulating layer 14, to be formed later.

Subsequently, an acrylic resin having a small relative permittivity of around 3–4 and high transparency is applied in a thickness of around 3 μm by spincoating so as to form the inter-layer insulating film 14. The inter-layer insulating film 14 undergoes exposure and development processes to form the contact hole 13. The pixel electrode 5, to be formed later, and the drain electrode 7 of the TFT 8 are electrically connected to each other through the contact hole 13.

Next, a film with a thickness of 100 nm is made of ITO by sputtering, and a predetermined pattern of the pixel electrode 5 is formed by the ITO film using photolithography. In this case, since the inter-layer insulating film 14 is formed between the pixel electrode 5 and the gate signal line 2 and source signal line 3, it is possible to overlap the pixel electrode 5 and at least either one of the gate signal line 2 and the source signal line 3. In this embodiment, the pixel electrode 5 overlaps the gate signal line 2 and the source signal line 3 so that the widths of the overlapped regions of the pixel electrode 5 and the gate signal line 2 and of the pixel electrode 5 and the source signal line 3 are not less than 1 μm, respectively. By overlapping the pixel electrode 5 and the gate signal line 2 and source signal line 3 in the above-mentioned manner, it is possible to prevent a lowering of the aperture ratio due to displacement of a pattern of the pixel electrode 5 which occurs in the process using photolithography.

A liquid crystal display device can be produced by fastening the active matrix substrate thus fabricated and a counter substrate having thereon a common electrode, a light blocking film, etc. with a sealing agent and a spacer to keep a predetermined space therebetween, introducing a liquid crystal between the substrates, and connecting a driving circuit, a back light and so on.

Finally, no display defects, such as flicker and vertical cross-talk, were observed on the liquid crystal display device of this embodiment.

[Embodiment 2]

Figure 4:
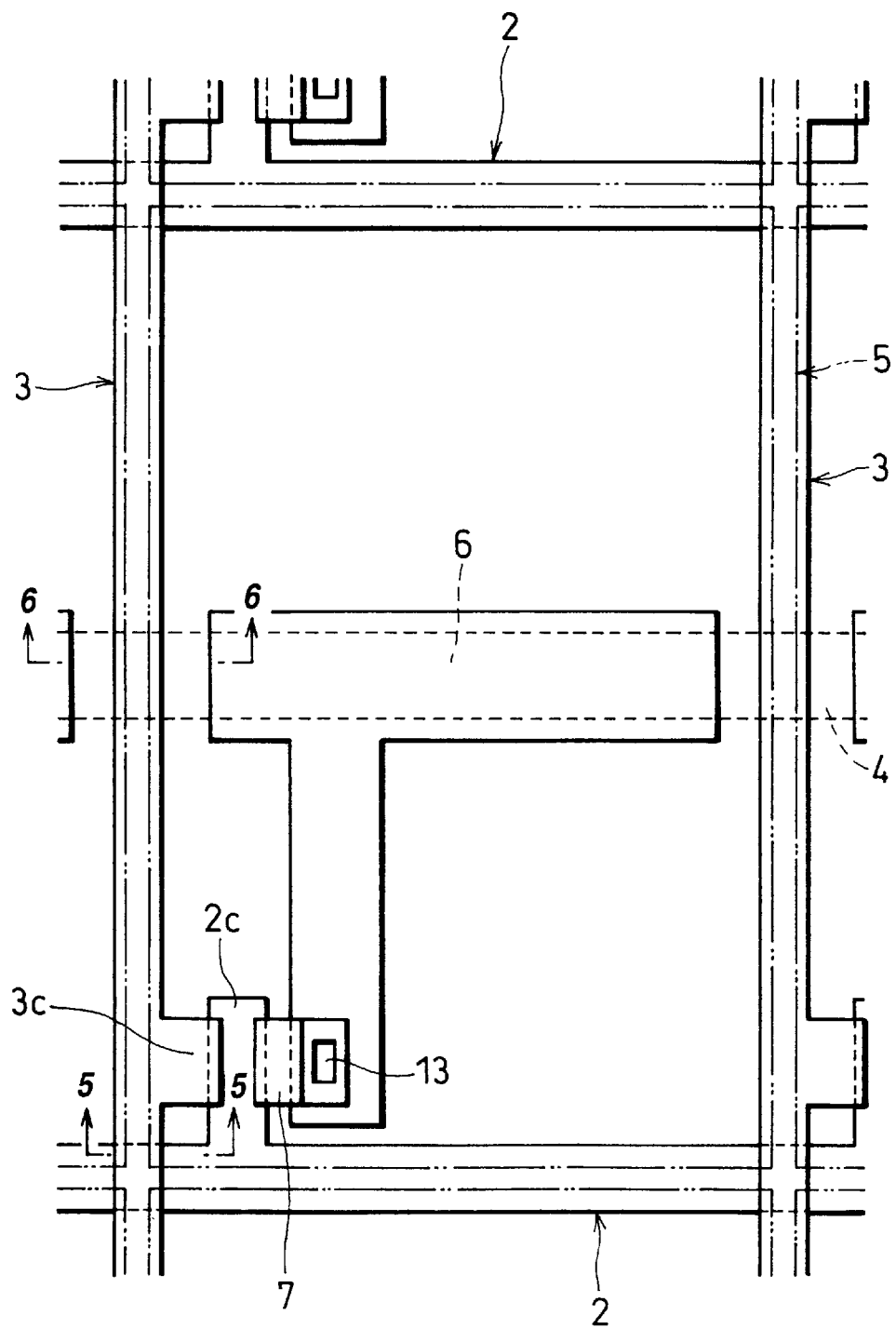
FIG. 4 is a plan view showing the structure of an active matrix substrate used in a liquid crystal display device according to another embodiment of the present invention.
Figure 5:
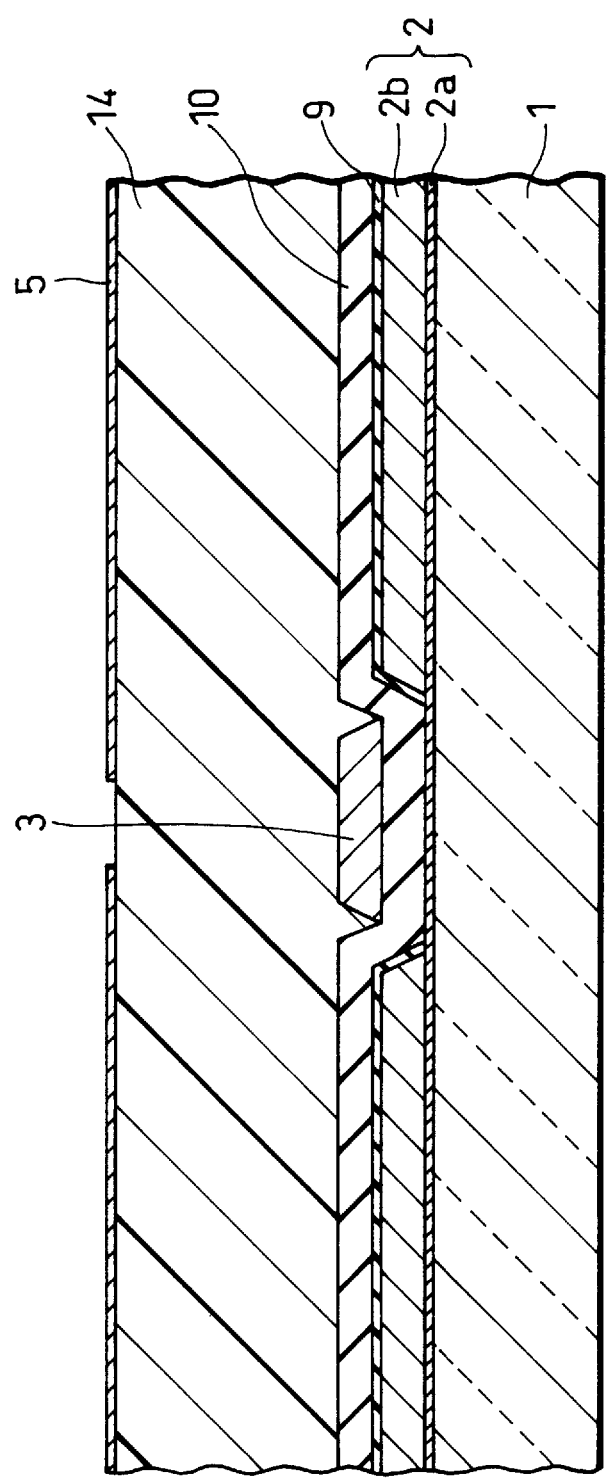
FIG. 5 is a sectional view showing a cross section cut along the C—C plane in FIG. 4.
Figure 6:
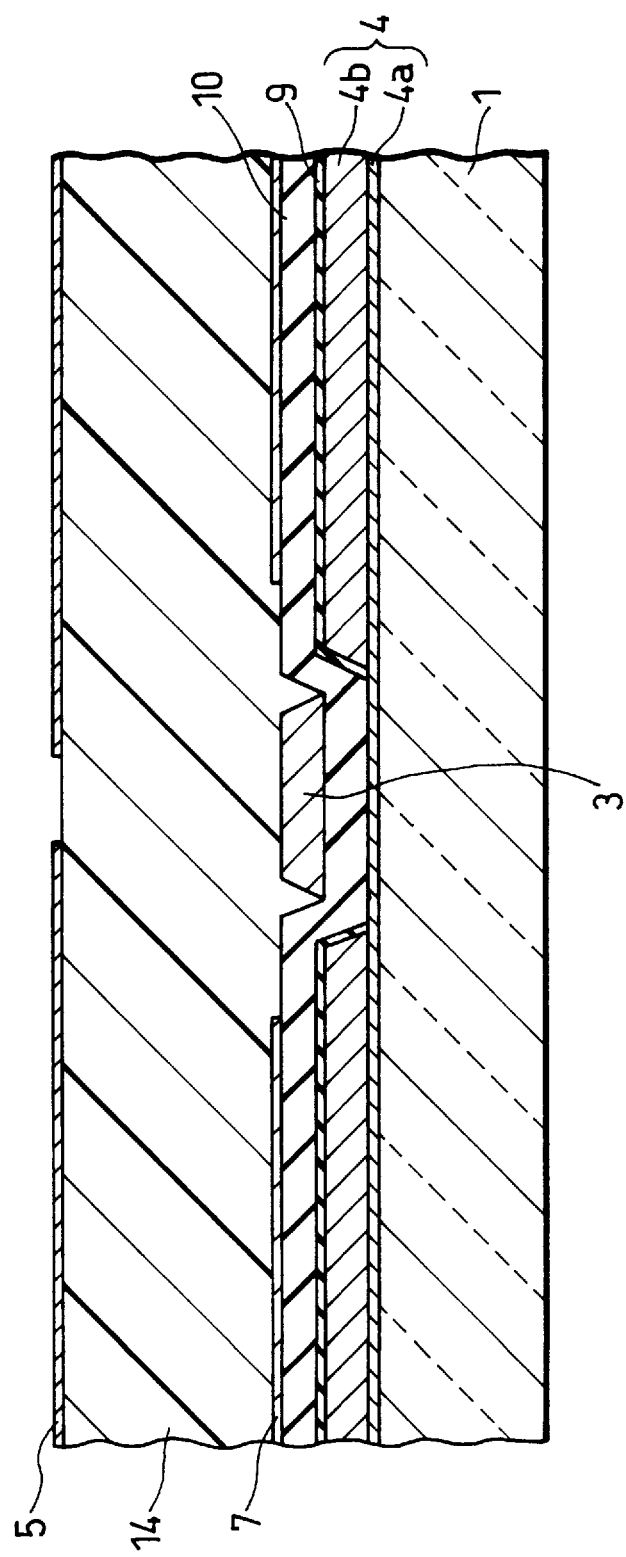
FIG. 6 is a sectional view showing a cross section cut along the D—D plane in FIG. 4.
Figure 7:
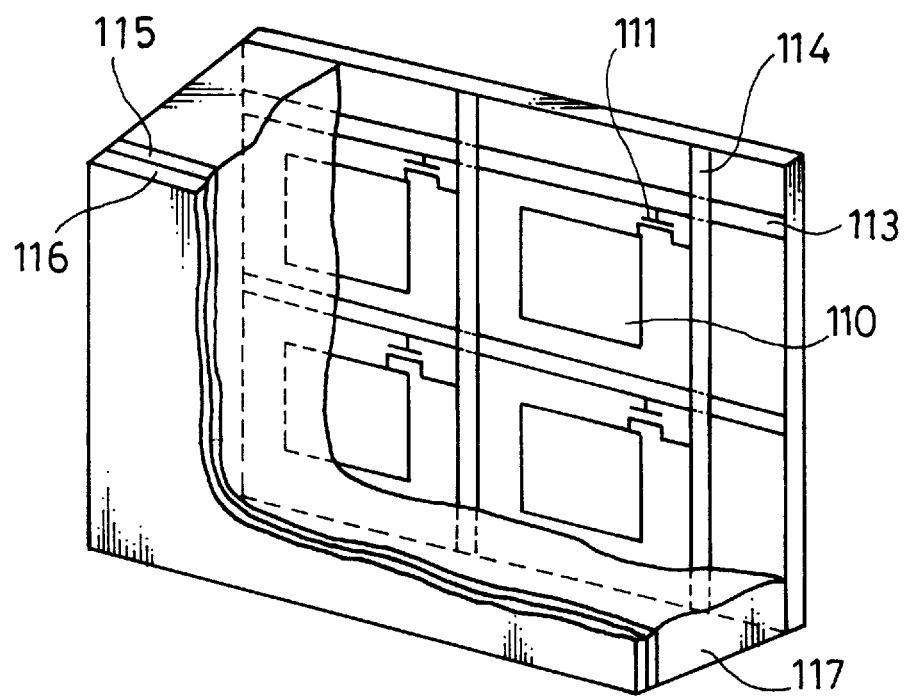
FIG. 7 is a broken view depicting a schematic structure of a conventional active matrix type liquid crystal display device.
Figure 8:
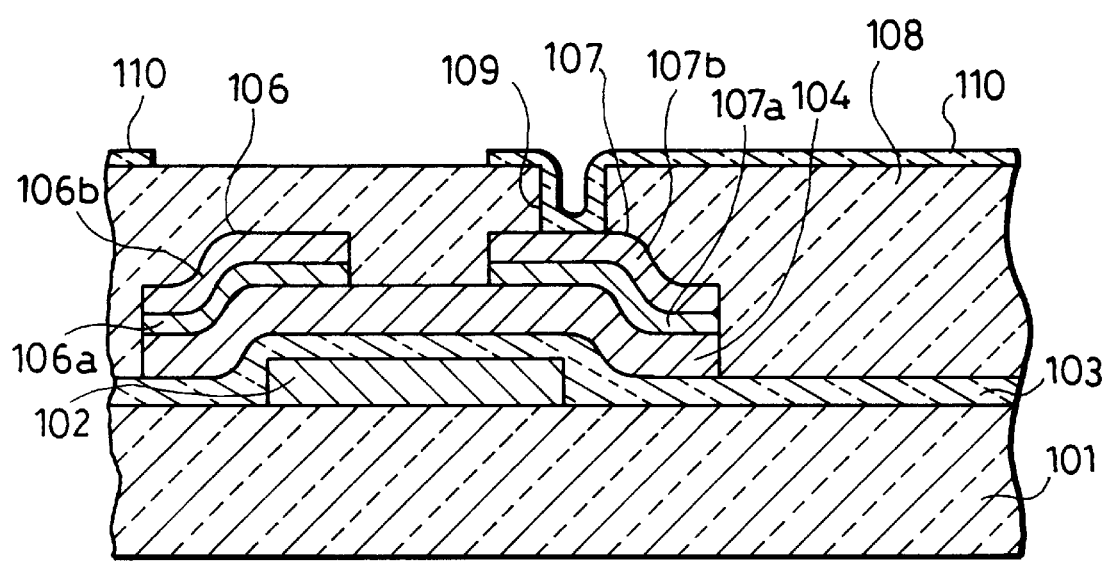
FIG. 8 is a sectional view showing the structure of the active matrix type liquid crystal display device of FIG. 7.

The following description will discuss another embodiment of the present invention with reference to FIGS. 4 to 6. The structures having the same function as in above-mentioned Embodiment 1 will be designated by the same code and their description will be omitted.

FIG. 4 is a plan view showing the structure of an active matrix substrate in a liquid crystal display device according to this embodiment. The basic structure of the active matrix substrate which can be seen in FIG. 4 is the same as that of Embodiment 1, and therefore the explanation thereof will be omitted.

Referring to FIG. 5, the intersection of the gate signal line 2 and the source signal line 3 shown in FIG. 4 will be explained in detail below. FIG. 5 is a sectional view showing a cross section cut along the C—C plane in FIG. 4. As shown in FIG. 5, the gate signal line 2 having a double-layer structure is formed on the light transmitting substrate 1, and the gate insulating film 10 is formed to cover the gate signal line 2. The source signal line 3 is formed on the gate insulating film 10. Additionally, the inter-layer insulating film 14 is formed to cover the source signal line 3. The pixel electrode 5 is produced on the inter-layer insulating film 14.

As is clear from FIG. 5, in the liquid crystal display device of this embodiment, the gate signal line 2 is composed of a lower-layer line 2a and an upper-layer line 2b. However, at the intersections of the source signal line 3 and the gate signal line 2, the upper-layer line 2b is eliminated and thus only the lower-layer line 2a forms the gate signal line 2. Moreover, the oxide insulating film 9 is formed on the surface of the upper-layer line 2b. In this embodiment, the lower-layer line 2a is made of ITO, and the upper-layer line 2b is made of Ta.

Next, referring to FIG. 6, the structure of the intersection of the source signal line 3 and the storage capacitor line 4 will be explained in detail below.

FIG. 6 is a sectional view showing a cross section cut along the D—D plane in FIG. 4. As shown in FIG. 6, the storage capacitor line 4 having a double-layer structure is formed on the light transmitting substrate 1. In addition, the gate insulating film 10 is formed to cover these members. The source signal line 3 is arranged on the gate insulating film 10. Moreover, formed on the gate insulating film 10 is the drain electrode 7 which is extended from the TFT 8 to produce the storage capacitor section 6. The inter-layer insulating film 14 is formed to cover the source signal line 3 and the drain electrode 7. Furthermore, the pixel electrode 5 is arranged on the inter-layer insulating film 14.

As is clear from FIG. 6, in the liquid crystal display device of this embodiment, the storage capacitor line 4 is composed of a lower-layer line 4a and an upper-layer line 4b. However, at the intersection of the gate signal line 2 and the storage capacitor line 4, the upper-layer line 4b is eliminated and only the lower-layer line 4a forms the storage capacitor line 4. In this embodiment, the lower-layer line 4a is made of ITO, and the upper-layer line 4b is made of Ta.

Next, the following description will explain a method for fabricating the active matrix substrate in the liquid crystal display device of this embodiment having the above-mentioned structure.

First, ITO is deposited to form a film with a thickness of 50 nm to 150 nm on the light transmitting substrate 1, for example, a glass substrate, by sputtering. Subsequently, photolithography is used to produce a pattern by the ITO film so that the lower-layer line 2a of the gate signal line 2 having the gate electrode 2c of the TFT 8 and the lower-layer line 4a of the storage capacitor line 4 are simultaneously formed.

Next, Ta is deposited to form a film with a thickness of 300 nm by sputtering. Subsequently, photolithography is used to produce a pattern by the Ta film so that the upper-layer line 2b of the gate signal line 2 and the upper-layer line 4b of the storage capacitor line 4 are simultaneously formed. At this time, a care must be taken so that the upper-layer lines 2b and 4b are not formed at the intersection with the source signal line 3, to be formed later.

Next, the oxide insulating film 9 is formed on the surfaces of the upper lines 2b and 4b by anodic oxidation. It is possible to use thermal oxidation instead of anodic oxidation to produce the oxide insulating film 9. Furthermore, the gate insulating film 10 with a thickness of 300 nm is formed by silicon nitride over the entire surface of the light transmitting substrate 1 by plasma CVD so as to cover the gate signal line 2, the storage capacitor line 4, and the oxide insulating film 9.

Thereafter, the channel layer 11 made of an amorphous silicon semiconductor in each TFT 8 is formed by plasma CVD. In addition, the contact layer 12 with a thickness of 50 nm is formed by $n^+$ amorphous silicon or $n^+$ microcrystal silicon to which phosphorus is added by plasma CVD. Then, photolithography is used to simultaneously produce a predetermined pattern by the contact layer 12 and the channel layer 11 in regions where the TFTs 8 are formed.

Next, ITO is deposited to form a film with a thickness of 100 nm by sputtering. Subsequently, by producing a predetermined pattern with the ITO film using photolithography, the lower-layer line 7a of the drain electrode 7, which is extended to the storage capacitor line 4 to produce a storage capacity, is formed. As a result, the storage capacitor line 4 and the lower-layer line 7a of the drain electrode 7 are placed one upon another with the gate insulating layer 10 therebetween, thereby producing the storage capacitor section 6.

Next, Ta is deposited to form a film with a thickness of 300 nm by sputtering. Thereafter, by producing a predetermined pattern with the Ta film using photolithography, the source signal line 3 having the source electrode 3c of the TFT 8, and an upper-layer line 7b of the drain electrode 7 are simultaneously formed. In this case, the upper-layer line 7b of the drain electrode 7 is arranged to extend at least to the position of the contact hole 13 in the inter-layer insulating layer 14, to be formed later.

Subsequently, an acrylic resin having a small relative permittivity of around 3–4 and high transparency is applied in a thickness of around 3 μm by spincoating so as to form the inter-layer insulating film 14. The inter-layer insulating film 14 undergoes exposure and development processes to form the contact hole 13. The pixel electrode 5, to be formed later, and the drain electrode 7 of the TFT 8 are electrically connected to each other through the contact hole 13.

Next, a film with a thickness of 100 nm is made of ITO by sputtering, and a predetermined pattern of the pixel electrode 5 is formed by the ITO film using photolithography. In this case, since the inter-layer insulating film 14 is formed between the pixel electrode 5 and the gate signal line 2 and source signal line 3, it is possible to overlap the pixel electrode 5 and at least either one of the gate signal line 2 and the source signal line 3. In this embodiment, the pixel electrode 5 overlaps the gate signal line 2 and the source signal line 3 so that the widths of the overlapped regions of the pixel electrode 5 and the gate signal line 2 and of the pixel electrode 5 and the source signal line 3 are not less than 1 μm, respectively. By overlapping the pixel electrode 5 and the gate signal line 2 and source signal line 3 in the above-mentioned manner, it is possible to prevent a lowering of the aperture ratio due to a pattern shift.

A liquid crystal display device can be produced by fastening the active matrix substrate thus fabricated and a counter substrate having thereon a common electrode, a light blocking film, etc. with a sealing agent and a spacer to keep a predetermined space therebetween, introducing a liquid crystal between the substrates, and connecting a driving circuit, a back light and so on. It is also possible to use a reflective plate instead of the back light.

Similarly to Embodiment 1, no display defects were observed on the liquid crystal display device of this embodiment.

In Embodiments 1 and 2, the upper-layer line of the gate signal line, the source signal line or the storage capacitor line is made of Ta. However, it is also possible to form the upper-layer line by a metal having a small electrical resistance, for example, Al. Alternatively, it is possible to use an alloy formed, for example, by adding a small amount of molybdenum or tungsten to Ta or Al.

Moreover, in Embodiments 1 and 2, the inter-layer insulating film is formed by an acrylic resin having high transparency. However, it is also possible to form the inter-layer insulating film by a resin material having low transparency and then making the resin material transparent by chemical or optical discoloring treatment.

Furthermore, it is possible to color the inter-layer insulating film 14 in the three primary colors, red, green and blue, to correspond to the pixel electrodes 5. Coloring may be carried out by chemical coloring treatment or by printing transfer to the resin. Consequently, there is no need to separately provide a color filter, resulting in a reduction in the cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix substrate comprising:
   a substrate; and
   more than one kind of lines made of an electrically conductive film, said lines being arranged to cross each other on said substrate,
   wherein a film thickness of at least one of said lines at an intersection of said lines is thinner than a film thickness thereof at portions other than the intersection;
   wherein the electrically conductive film of at least one line is a multi-layer film having a first layer made of ITO and a second layer made of a metal having a lower electrical resistance than ITO, and said second layer is eliminated at the intersection.

2. The active matrix substrate as set forth in claim 1, wherein one kind of said lines is made of an electrically conductive multi-layer film, and at least one of the layers forming said multi-layer film is eliminated at the intersection.

3. The active matrix substrate comprising:
   a scanning line and a signal line arranged to cross each other at an intersection;
   a switching element to which a scanning signal and a data signal are supplied by said scanning line and said signal line, respectively;
   wherein at least one of said scanning line and said signal line is made of an electrically conductive multi-layer film, and at least one of the layers forming said multi-layer film is eliminated at the intersection;

wherein said electrically conductive multi-layer film is formed by a first layer made of ITO and a second layer made of a metal having a lower electrical resistance than ITO, and said second layer is eliminated at the intersection.

4. The active matrix substrate as set forth in claim 3, wherein said signal line is made of the electrically conductive multi-layer film, and at least one of the layers forming said multi-layer film is eliminated at the intersection with the scanning line.

5. The active matrix substrate as set forth in claim 3, wherein said second layer contains Ta.

6. The active matrix substrate as set forth in claim 5, wherein said second layer contains Al.

7. An active matrix substrate comprising:

a scanning line and a signal line arranged to cross each other;

a switching element to which a scanning signal and a data signal are supplied by said scanning line and said signal line, respectively;

a pixel electrode driven by said switching element;

an inter-layer insulating film between said pixel electrode and said scanning and signal lines, and having a contact hole through which said switching element is electrically connected to said pixel electrode;

wherein a film thickness of at least one of said scanning line and said signal line at an intersection of said scanning line and said signal line is thinner than a film thickness thereof at portions other than the intersection;

a storage capacitor line parallel with said scanning line and crossing said signal line; and an electrically conductive extended section which is extended from a contact section of said switching element and said pixel electrode to a position where said extended section overlaps said storage capacitor line, wherein a storage capacity is produced between said storage capacitor line and said extended section, and at least a film thickness of one of said signal line and said storage capacitor line at an intersection of said signal line and said storage capacitor line is thinner than a film thickness thereof at portions other than the intersection.

8. An active matrix substrate as set forth in claim 7, wherein only one of said signal line and said storage capacitor line is made of an electrically conductive multi-layer film, and at least one of the layers forming said multi-layer film is eliminated at the intersection.

9. The active matrix substrate as set forth in claim 8, wherein said electrically conductive multi-layer film is formed by a first layer made of ITO and a second layer made of a metal having a lower electrical resistance than ITO, and said second layer is eliminated at the intersection.

10. The active matrix substrate as set forth in claim 9, wherein said second layer contains Ta.

11. The active matrix substrate as set forth in claim 9, wherein said second layer contains Al.

12. The active matrix substrate as set forth in claim 7, wherein the contact section of said switching element and said pixel electrode is formed by layering a first layer made of ITO in contact with said switching element and a second layer made of a metal having a lower electrical resistance than ITO in contact with said pixel electrode, and said extended section is formed by said first layer.

13. The active matrix substrate as set forth in claim 12, wherein said second layer contains Ta.

14. The active matrix substrate as set forth in claim 12, wherein said second layer contains Al.

15. The active matrix substrate as set forth in one of claims 3 or 7, wherein said inter-layer insulating film is made of an organic material.

16. The active matrix substrate as set forth in claim 15, wherein said inter-layer insulating film is made of an acrylic resin.

17. The active matrix substrate as set forth in claim 15, wherein said inter-layer insulating film is made of a photosensitive resin.

18. The active matrix substrate as set forth in one of claims 3 or 7, wherein said pixel electrode and at least one of said scanning line and said signal line overlap each other.

19. The active matrix substrate as set forth in claim 18, wherein said pixel electrode overlaps said scanning line and said signal line so that widths of overlapped regions of said pixel electrode and said scanning line and of said pixel electrode and said signal line are not less than 1 $\mu$m, respectively.

20. An active matrix type liquid crystal display device, including an active matrix substrate as in any of claims 1, 3 or 7 and further comprising:

a counter substrate; and a liquid crystal sandwiched between said active matrix substrate and said counter substrate.

* * * * *